R. V. JONES.

Sausage Machine.

No. 2,055. Reissued Aug. 22, 1865.

Witnesses
J. W. Mann
Charles Alexander

Inventor
R V Jones
per G H Alexander
atty.

N. PETERS, Photo-Lithographer, Washington, D. C.

UNITED STATES PATENT OFFICE.

ROBERT V. JONES, OF CANTON, OHIO.

MEAT-CUTTER.

Specification forming part of Letters Patent No. 21,965, dated November 2, 1858; Reissue No. 2,055, dated August 22, 1865.

*To all whom it may concern:*

Be it known that I, ROBERT V. JONES, of Canton, in the county of Stark and State of Ohio, have invented certain new and useful Improvements in Meat-Cutters; and I do hereby declare that the following is a full, clear, and exact description of the same, reference being had to the accompanying drawings, and to the letters of reference marked thereon.

Figure 1:
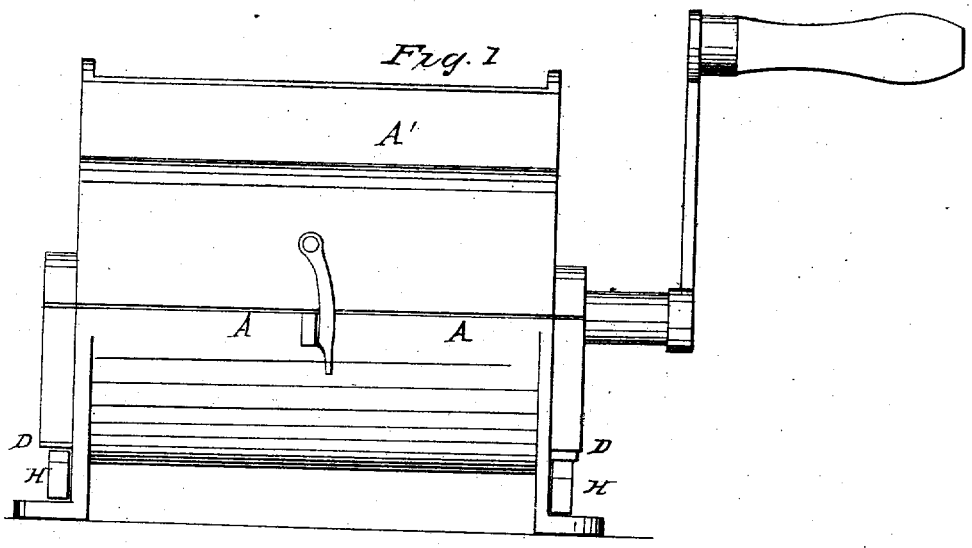
Figure 2:
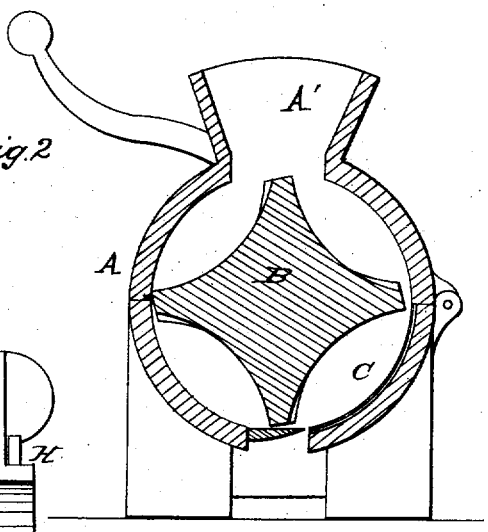
Figure 3:
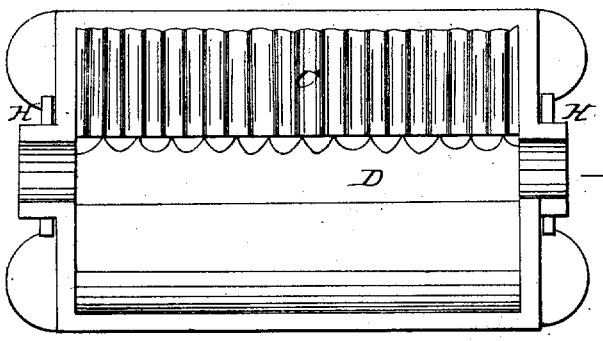

In the annexed drawings, making part of this specification, Figure 1 represents a side elevation. Fig. 2 represents a cross-section. Fig. 3 is a plan view of the lower portion of the case with the flanged shaft removed, showing the ribs and knife or knives.

In the drawings, A represents a metallic case, which is cast in a cylindrical form and in two parts. The upper part is hinged to the lower, as shown at *x*, Fig. 2, and is provided with a hopper, A′, into which the meat is placed which is to be cut up. The lower or bottom portion of this case is cast with ribs C C upon its side or sides. In the bottom of the lower half of the case there is an opening made longitudinally of the case, and in or immediately above this opening is secured a knife or knives for cutting the meat.

The case A is provided with journal boxes in its ends, in which play the journals of a shaft, B.

Cylinder B is provided, as shown in Fig. 2, with a series of spiral flanges running longitudinally of it and revolving in close proximity to the ribs on the case, forming the meat into creases, and also close to the knife or knives, cutting and shearing off the meat in fine particles or pieces. The shaft B is provided with a handle, by means of which it is revolved in the case A.

D represents the knife in the case, which is provided with a series of V-shaped cutting-edges. Said knife is secured in its position by means of wedges H H.

This machine is very simple in its construction, is cheap, easily cleaned, and possesses another advantage—that the meat passes from the machine as soon as cut and does not, as in some other machines, remain to be mangled by repeated revolutions of the shaft.

Having thus fully described my invention, what I claim as new, and desire to secure by Letters Patent, is—

1. The combination of a shaft provided with spiral flanges, with a concave case provided with ribs upon its internal surface, the two being used and operating as and for the purpose herein specified.

2. The combination of a shaft provided with spiral flanges, with a knife or knives used in a concave case, as and for the purpose specified.

3. The employment of a spiral-flanged shaft, in combination with and revolving in a ribbed case provided with a stationary knife or knives, as and for the purpose herein specified.

ROBERT V. JONES.

Witnesses:

C. W. ALEXANDER,

J. M. MASON.